United States Patent
Antchak et al.

(10) Patent No.: US 9,638,270 B2
(45) Date of Patent: May 2, 2017

(54) DECOUPLER CARRIER WITH BALANCED FORCES

(71) Applicant: LITENS AUTOMOTIVE PARTNERSHIP, Woodbridge (CA)

(72) Inventors: John R. Antchak, Aurora (CA); Warren J. Williams, Oakville (CA)

(73) Assignee: LITENS AUTOMOTIVE PARTNERSHIP, Woodbridge, ON, Toronto ( * ) Notice: Subject to any disclaimer, the term of this patent is extended or adjusted under 35 U.S.C. 154(b) by 0 days.

(21) Appl. No.: 14/413,147

(22) PCT Filed: Aug. 7, 2013

(86) PCT No.: PCT/CA2013/000690
§ 371 (c)(1),
(2) Date: Jan. 6, 2015

(87) PCT Pub. No.: WO2014/022912
PCT Pub. Date: Feb. 13, 2014

(65) Prior Publication Data
US 2015/0122610 A1 May 7, 2015

Related U.S. Application Data

(60) Provisional application No. 61/680,558, filed on Aug. 7, 2012, provisional application No. 61/756,896, filed
(Continued)

(51) Int. Cl.
*F16D 41/20* (2006.01)
*F16D 7/02* (2006.01)
(Continued)

(52) U.S. Cl.
CPC ............... *F16D 41/20* (2013.01); *F16D 3/12* (2013.01); *F16D 7/022* (2013.01); *F16D 13/12* (2013.01);
(Continued)

(58) Field of Classification Search
None
See application file for complete search history.

(56) References Cited

U.S. PATENT DOCUMENTS 1,934,790 A 11/1933 Brownlee
2,021,718 A 11/1935 Fast
(Continued)

FOREIGN PATENT DOCUMENTS

CN 101111692 A 1/2008
WO 9506827 A1 3/1995
(Continued)

OTHER PUBLICATIONS

Webster's Encyclopedic Unabridged Dictionary of the English Language, 1983.*
(Continued)

*Primary Examiner* — Robert A Siconolfi
*Assistant Examiner* — Ryan Dodd
(74) *Attorney, Agent, or Firm* — Millman IP Inc.

(57) ABSTRACT

In one aspect, a decoupler comprises an input member, an output member, and a torsional isolation spring, a carrier, and a wrap spring clutch configured to operate in a first mode in which rotary power is transmitted in a first rotational direction from the input member to the output member serially through the wrap spring clutch, the carrier, and the isolation spring, and a second mode in which the output member overruns the input member in the first rotational direction. The carrier has a carrier clutch drive face that receives a first vector force from an end of the wrap spring
(Continued)

clutch, and an isolation spring drive face that receives a second vector force from an end of the isolation spring. The wrap spring clutch and isolation spring drive faces are arranged so as to direct the second vector force to intersect with the first vector force substantially at the carrier clutch drive face.

16 Claims, 15 Drawing Sheets

Related U.S. Application Data on Jan. 25, 2013, provisional application No. 61/775,302, filed on Mar. 8, 2013.

(51) Int. Cl.
| | |
|---|---|
| *F16D 3/12* | (2006.01) |
| *F16F 15/123* | (2006.01) |
| *F16D 13/12* | (2006.01) |
| *F16D 43/24* | (2006.01) |
| *F16H 7/20* | (2006.01) |
| *F16H 55/36* | (2006.01) |
| *F16D 13/76* | (2006.01) |
| *F16D 43/21* | (2006.01) |

(52) U.S. Cl.
 CPC .......... *F16D 13/76* (2013.01); *F16D 43/211* (2013.01); *F16D 43/24* (2013.01); *F16F 15/123* (2013.01); *F16H 7/20* (2013.01); *F16H 55/36* (2013.01); *F16H 2055/366* (2013.01)

(56) References Cited

U.S. PATENT DOCUMENTS

| | | | |
|---|---|---|---|
| 2,336,757 A | 12/1943 | Starkey | |
| 3,618,730 A * | 11/1971 | Mould, III | F16D 43/211 192/56.2 |
| 3,926,286 A | 12/1975 | Johnson | |
| 4,263,995 A * | 4/1981 | Wahlstedt | F16D 27/105 192/35 |
| 4,638,899 A | 1/1987 | Kossett | |
| 5,133,437 A | 7/1992 | Larson | |
| 5,454,249 A | 10/1995 | Kempf | |
| 5,464,083 A | 11/1995 | Arnold et al. | |
| 5,477,715 A | 12/1995 | Kempf et al. | |
| 5,538,118 A | 7/1996 | Kempf et al. | |
| 5,697,125 A | 12/1997 | Gannon | |
| 5,771,539 A | 6/1998 | Wahlstedt | |
| 5,787,549 A | 8/1998 | Soderlund | |
| 6,083,130 A * | 7/2000 | Mevissen | F02B 67/06 192/107 T |
| RE37,712 E | 5/2002 | Gannon | |
| 6,530,123 B1 | 3/2003 | Wahlstedt | |
| 6,561,333 B2 | 5/2003 | Larson et al. | |
| 6,637,571 B2 | 10/2003 | Arnold et al. | |
| 7,007,780 B2 | 3/2006 | Arnold et al. | |
| 7,051,854 B2 | 5/2006 | Kossett | |
| 7,070,033 B2 | 7/2006 | Jansen et al. | |
| 7,257,860 B2 | 8/2007 | Jankovich et al. | |
| 7,618,337 B2 | 11/2009 | Jansen et al. | |
| 7,712,592 B2 * | 5/2010 | Jansen | F16D 3/52 192/41 S |
| 7,975,821 B2 * | 7/2011 | Antchak | F16D 7/022 192/41 S |
| 8,047,920 B2 | 11/2011 | Jansen et al. | |
| 8,534,438 B2 | 9/2013 | Antchak et al. | |
| 8,813,692 B2 | 8/2014 | Bialas et al. | |
| 8,813,693 B2 | 8/2014 | Bialas et al. | |
| 8,813,932 B2 * | 8/2014 | Ward | F16D 41/206 192/41 S |
| 8,985,293 B2 * | 3/2015 | Marion | F16D 13/76 192/113.32 |
| 2011/0245000 A1 | 10/2011 | Serkh | |
| 2013/0233670 A1 | 9/2013 | Ward | |

FOREIGN PATENT DOCUMENTS

| | | |
|---|---|---|
| WO | 9720125 A1 | 6/1997 |
| WO | 9812404 A1 | 3/1998 |
| WO | 03021124 A3 | 3/2003 |
| WO | 02084056 A3 | 10/2003 |
| WO | 2004070225 A1 | 8/2004 |
| WO | 2005028899 A1 | 3/2005 |
| WO | 2006029087 A1 | 3/2006 |
| WO | 2006081657 A1 | 8/2006 |
| WO | 2007103519 A3 | 11/2007 |
| WO | 2010048732 A1 | 6/2010 |
| WO | 2011160208 A1 | 12/2011 |
| WO | 2012061936 A1 | 5/2012 |
| WO | 2012162280 A1 | 11/2012 |
| WO | 2013055610 A1 | 4/2013 |
| WO | 2013131166 A1 | 9/2013 |

OTHER PUBLICATIONS

Webster's II New Riverside University Dictionary, 1984.*
Search Report and Written Opinion for PCT/CA2013/000690, Oct. 24, 2013, ISA.
International Preliminary Report on Patentability for PCT/CA2013/000690, Feb. 10, 2015, ISA.
International Search Report and Written Opinion for EP2882973.
IP1461623P, First Office Action and Search Report in Chinese.
Second Office Action for CN201380041669.9.
English translation of second Office Action for CN201380041669.9.
Reporting letter for second Office Action for CN201380041669.9.

* cited by examiner

DECOUPLER CARRIER WITH BALANCED FORCES

CROSS-REFERENCE TO RELATED APPLICATIONS

This application claims priority to U.S. Provisional Application No. 61/680,558, filed Aug. 7, 2012, U.S. Provisional Application No. 61/756,896, filed Jan. 25, 2013, and U.S. Provisional Application No. 61/775,302, filed Mar. 8, 2013, the entire contents of all of which are incorporated herein by reference.

FIELD OF THE DISCLOSURE

The present disclosure relates to decouplers and more particularly to a decoupler with a wrap spring clutch that is positioned on a carrier.

BACKGROUND

This section provides background information related to the present disclosure which is not necessarily prior art.

Examples of known decouplers are described in WIPO Publication Nos. WO 2004/070225 and WO 2005/028899. While such decouplers are satisfactory for their intended use, such decouplers are nonetheless susceptible to improvement.

SUMMARY

This section provides a general summary of the disclosure, and is not a comprehensive disclosure of its full scope or all of its features.

In an aspect, the invention is directed to a decoupler that includes an input member, an output member, a wrap spring clutch, a carrier and a torsional isolation spring. The carrier has a carrier clutch drive face and an isolation spring drive face thereon, which are arranged so as to incur forces from the wrap spring clutch and the isolation spring respectively in a selected way so as to inhibit a net force on the carrier that brings the carrier into engagement with a radial clutch drive surface that surrounds the carrier. In another aspect, the invention is directed to the carrier itself having the selected arrangement of the drive faces.

In another aspect, the invention is directed to a decoupler that includes an input member, an output member, and a torsional isolation spring, a carrier, and a wrap spring clutch which are configured to operate in a first mode in which rotary power is transmitted in a first rotational direction from the input member to the output member serially through the wrap spring clutch, the carrier, and the isolation spring, and a second mode in which the output member overruns the input member in the first rotational direction. The carrier has a carrier clutch drive face that receives a first vector force from a face at a helical end of the wrap spring clutch, and an isolation spring drive face that receives a second vector force from a face at a helical end of the isolation spring. The carrier clutch drive face and the isolation spring drive face are arranged so as to direct the second vector force to intersect with the first vector force substantially at the carrier clutch drive face.

In yet another aspect, the invention is directed to a decoupler that includes an input member, an output member, and a torsional isolation spring, a carrier, and a wrap spring clutch which are configured to operate in a first mode in which rotary power is transmitted in a first rotational direction from the input member to the output member serially through the wrap spring clutch, the carrier, and the isolation spring, and a second mode in which the output member overruns the input member in the first rotational direction. The input member has a radial clutch drive surface that is engageable with a radially outer surface of the wrap spring clutch for torque transfer therebetween. The carrier has a carrier clutch drive face that receives a first vector force from a face at a helical end of the wrap spring clutch, and an isolation spring drive face that receives a second vector force from a face at a helical end of the isolation spring. The carrier clutch drive face and the isolation spring drive face are arranged to have a selected included angle therebetween, so as to direct the second vector force to have a selected relationship with the first vector force so as to control a net force on the carrier that urges the carrier towards engagement with the radial clutch drive surface while substantially eliminating tensile stresses on the carrier.

In yet another aspect, the invention is directed to a decoupler that includes an input member, an output member, and a torsional isolation spring, a carrier, and a wrap spring clutch which are configured to operate in a first mode in which rotary power is transmitted in a first rotational direction from the input member to the output member serially through the wrap spring clutch, the carrier, and the isolation spring, and a second mode in which the output member overruns the input member in the first rotational direction. The input member has a radial clutch drive surface that is engageable with a radially outer surface of the wrap spring clutch for torque transfer therebetween. The carrier has a carrier clutch drive face that receives a first vector force from a face at a helical end of the wrap spring clutch, and an isolation spring drive face that receives a second vector force from a face at a helical end of the isolation spring. The wrap spring clutch has a mean wrap spring clutch diameter and the isolation spring has a mean isolation spring diameter. The carrier clutch drive face and the isolation spring drive face are arranged based at least in part on the mean wrap spring clutch diameter and the mean isolation spring diameter so as to control a net force on the carrier that urges the carrier towards engagement with the radial clutch drive surface while substantially eliminating tensile stresses on the carrier.

In some embodiments, the invention is directed to arranging the carrier clutch drive face and the isolation spring drive face to control a net force on the carrier. Controlling the net force on the carrier may be to control a force exerted between the carrier and a clutch drive surface surrounding the carrier. Additionally or alternatively, controlling the net force on the carrier may be to ensure that substantially all forces on the carrier are compressive forces.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
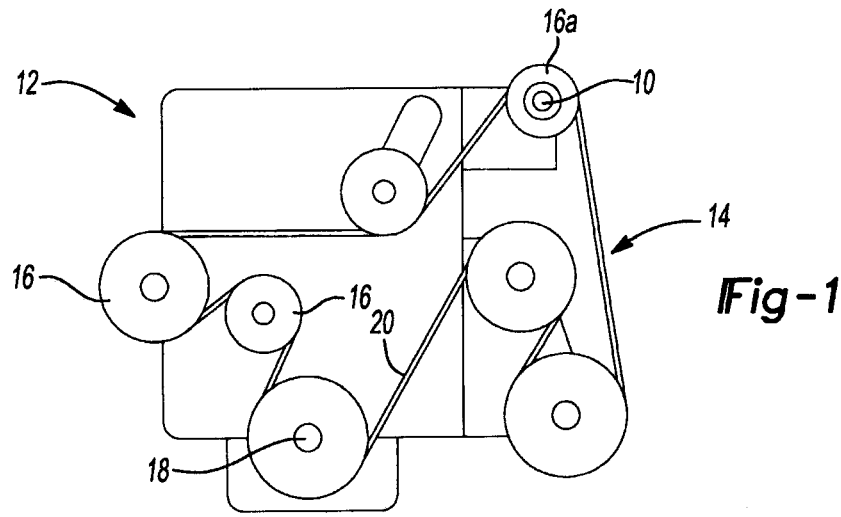
FIG. 1 is a schematic illustration in which a decoupler constructed in accordance with the teachings of the present disclosure is shown in operative association with an engine having a front accessory drive system.

With reference to FIG. 1 of the drawings, a decoupler constructed in accordance with the teachings of the present disclosure is generally indicated by reference numeral 10. The decoupler 10 is shown in operative association with an automotive engine 12 that can include an accessory drive system 14 having a plurality of engine accessories 16. In the particular example provided, the accessory drive system 14 is coupled to an output member (e.g., crankshaft) 18 of the engine 12. The accessory drive system 14 includes an endless power transmitting element 20, such as a belt, a chain or a plurality of gear teeth, that is configured to transmit rotary power from the engine output member 18 to input members, such as pulleys or sprockets, to drive the engine accessories 16. The decoupler 10 can be disposed between the endless power transmitting element 20 and one of the engine accessories (i.e., engine accessory 16a). It should be appreciated that while the decoupler 10 is illustrated in association with a front engine accessory drive, a decoupler constructed in accordance with the teachings of the present disclosure may be incorporated into various other devices in which a driven load is able at times to overspeed a source of rotary power.

Figure 2:
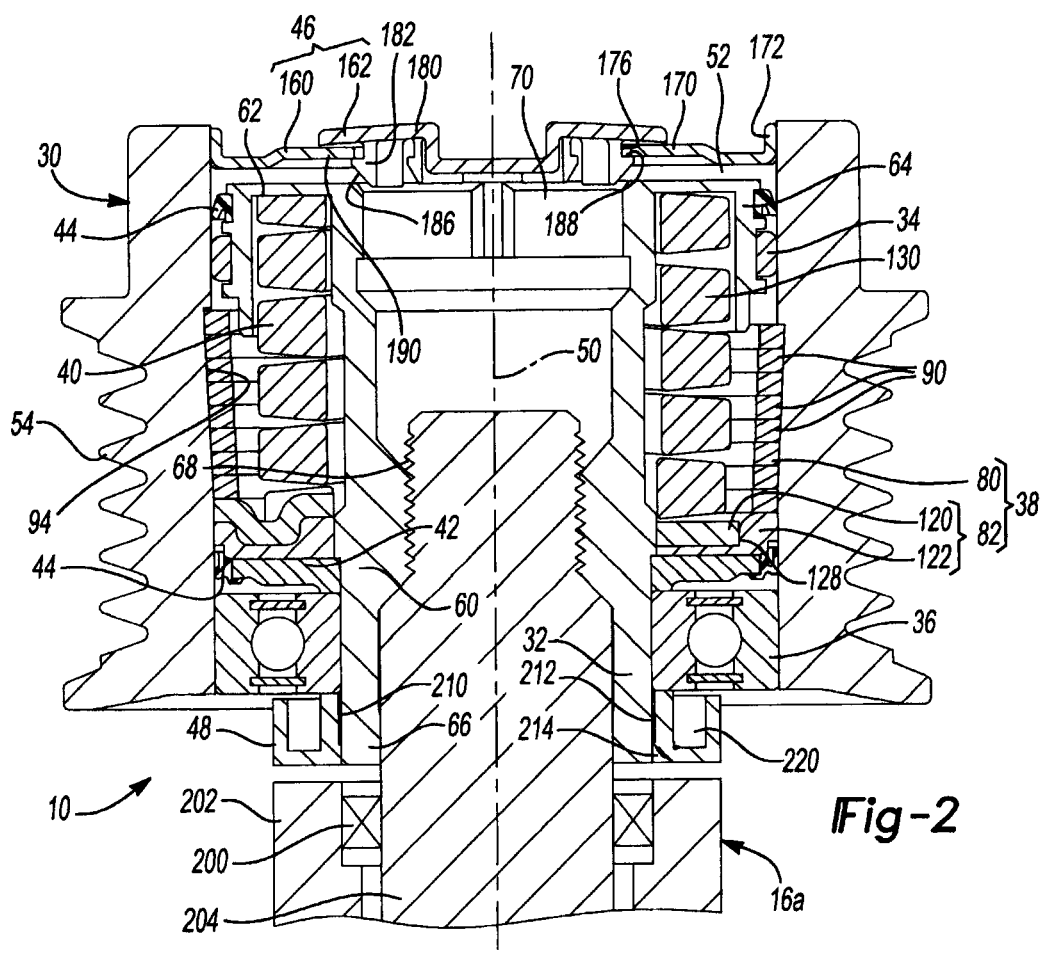
FIG. 2 is a longitudinal section view of the decoupler of FIG. 1.
Figure 3:
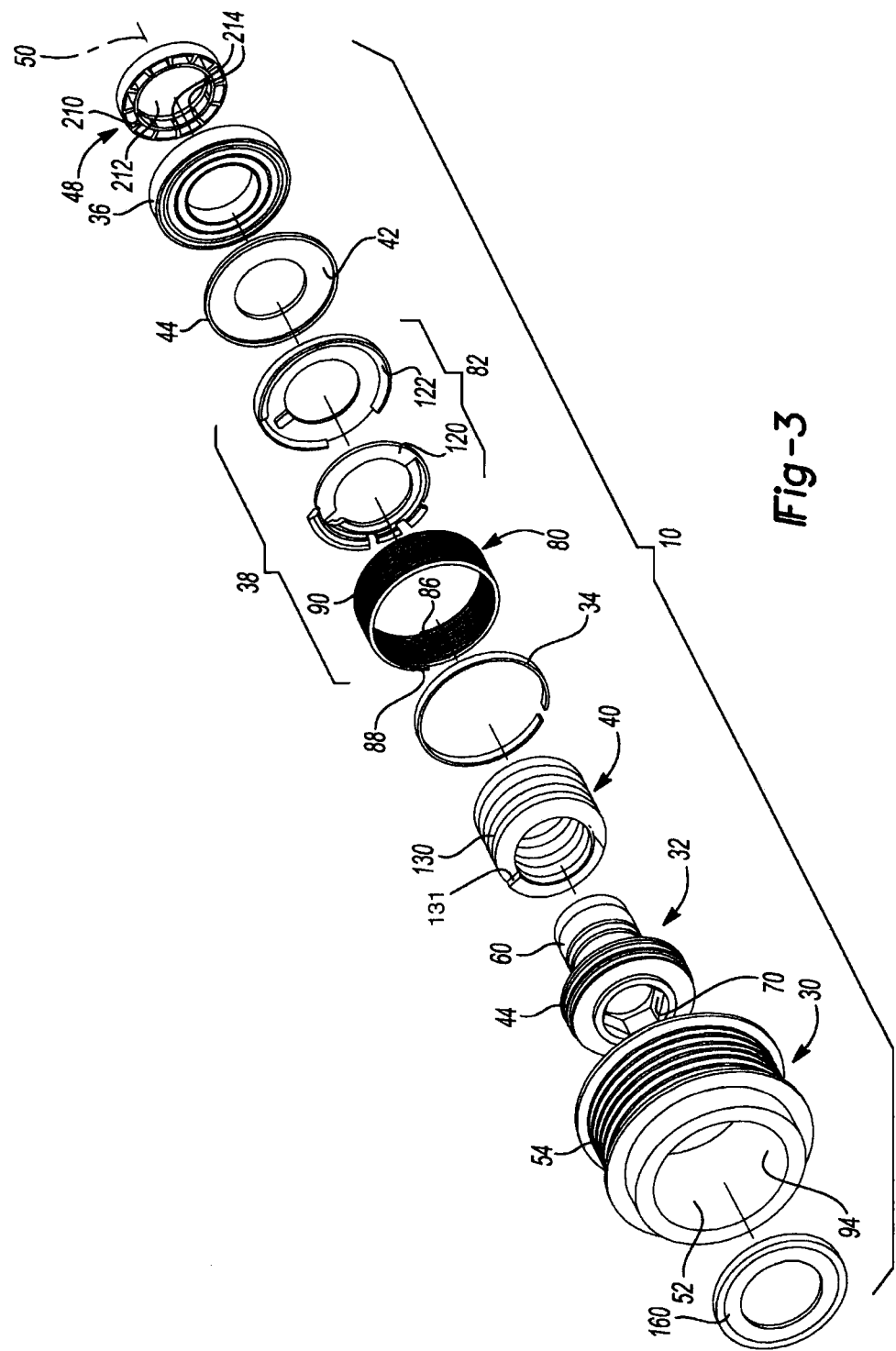
FIG. 3 is a front exploded perspective view of the decoupler of FIG. 1.

With reference to FIGS. 2 and 3, the decoupler 10 can comprise a drive or input member 30, a driven or output member 32, a first bearing 34, a second bearing 36, a spring 80 (which may be referred to as a wrap spring clutch 80) and a carrier 82 (which in some embodiments together form a clutch spring assembly 38), a torsionally-compliant member 40 (which may also be referred to as a torsional isolation spring or as an isolation spring), a thrust plate 42, a pair of seals 44, a front cover assembly 46, and a bearing shield 48.

The input member 30 can comprise any type of structure that is configured to engage the endless power transmitting element 20 (FIG. 1) to receive power therefrom to rotate the input member 30 about a rotary axis 50 of the decoupler 10. In the particular example provided, the input member 30 is an annular structure that can define a central bore 52 and which can have a polyvee portion 54 that is configured to engage a conventional poly-vee serpentine belt.

Figure 4:
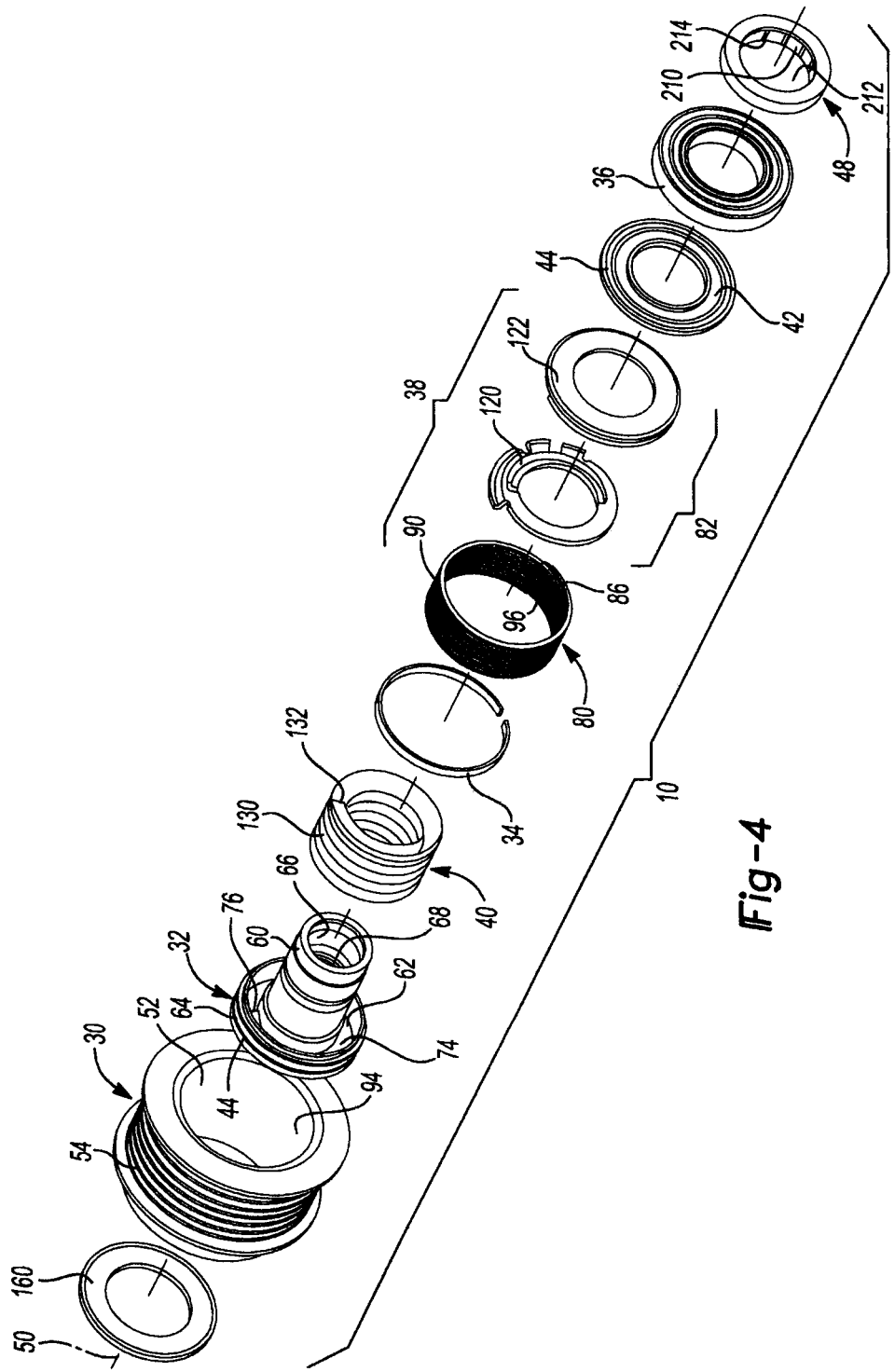
FIG. 4 is a rear exploded perspective view of the decoupler of FIG. 1.

With reference to FIGS. 2 through 4, the output member 32 can be received in the central bore 52 in the input member 30 and can comprise a a shaft-connection member 60 (which may be referred to as a hub 60), a first torsion spring ramp 62, and an annular collar 64. The hub 60 is connectable to an input shaft 204 of the engine accessory 16a. In the particular example provided, the hub 60 comprises a shaft-centering portion 66, a plurality of threads 68, and a tool-engaging portion 70. The shaft-centering portion 66 can comprise a low-tolerance (i.e., tightly-toleranced) bore that can be engaged to the input shaft 204 of the engine accessory 16a in a line to-line fit (or tighter) manner to ensure that the rotary axis 50 of the decoupler 10 is aligned to the rotational axis of the input shaft 204. The threads 68 can be configured to threadably engage corresponding threads formed on the input shaft 204 of the engine accessory 16a. The tool-engaging portion 70 is conventionally constructed to receive a tool (not shown) that permits the hub 60 to be rotated relative to the input shaft 204 during installation of the decoupler 10 to the engine accessory 16a. The first torsion spring ramp 62 can be disposed about the circumference of the hub 60 and can include a first spring abutment surface 74, which can be shaped in a helical manner that extends along the rotary axis 50, and a first spring drive face 76 that can extend generally perpendicular to the first spring abutment surface 74. The annular collar 64 can be coupled to a radially-outward end of the first torsion spring ramp 62 and can extend generally parallel to a portion of the hub 60. The annular collar 64 can be configured to receive thereon the first bearing 34, which can support the annular collar 64 for rotation in the central bore 52 relative to the input member 30. The annular collar 64 can also be configured to receive a first one of the seals 44 thereon such that the first one of the grease seals sealingly engage the input member 30 and the output member 32.

Similarly, the second bearing 36 can be received on the hub 60 and engaged to the inside diametrical surface of the central bore 52 to support the output member 32 for rotation relative to the input member 30. The first and second bearings 34 and 36 can be any type of bearing, including a rolling-element bearing, a journal bearing or a bushing. In the particular example provided, the first bearing 34 is a plastic bushing, while the second bearing 36 is a sealed ball bearing that is mounted on a low-tolerance (i.e., tightly toleranced) portion of the outside diametrical surface of the hub 60.

The torsional isolation spring 40, the carrier 82 and the wrap spring clutch 80 can be disposed serially in a load path between the input member 30 and the output member 32. For example, the torsional isolation spring 40, the carrier 82, and the wrap spring clutch may be configured to operate in a first mode in which rotary power is transmitted in a first rotational direction from the input member 30 through the wrap spring clutch 80, in turn through the carrier 82, in turn through the isolation spring 40 and into the output member 32, and a second mode in which the output member 32 overruns the input member 30 in the first rotational direction.

The clutch spring 80 (i.e. the wrap spring clutch 80) can be formed of an appropriate spring steel wire with a desired cross-sectional shape, such as a square or rectangular cross-sectional shape. The clutch spring 80 can have a first helical end 86, a second helical end 88 and a plurality of helical coils 90 disposed axially between the first and second helical ends 86 and 88. The helical coils 90 can be sized to engage a clutch drive surface 94 formed on the inside diametrical surface of the input member 30. The clutch drive surface 94 may also be referred to as a radial clutch drive surface 94. The first helical end 86 can terminate at a face 96 (FIG. 5) that can be formed generally perpendicular to the longitudinal axis of the wire that forms the clutch spring 80.

As shown in FIG. 2, the wrap spring clutch 80 is positioned outboard of the isolation spring 40.

Figure 5:
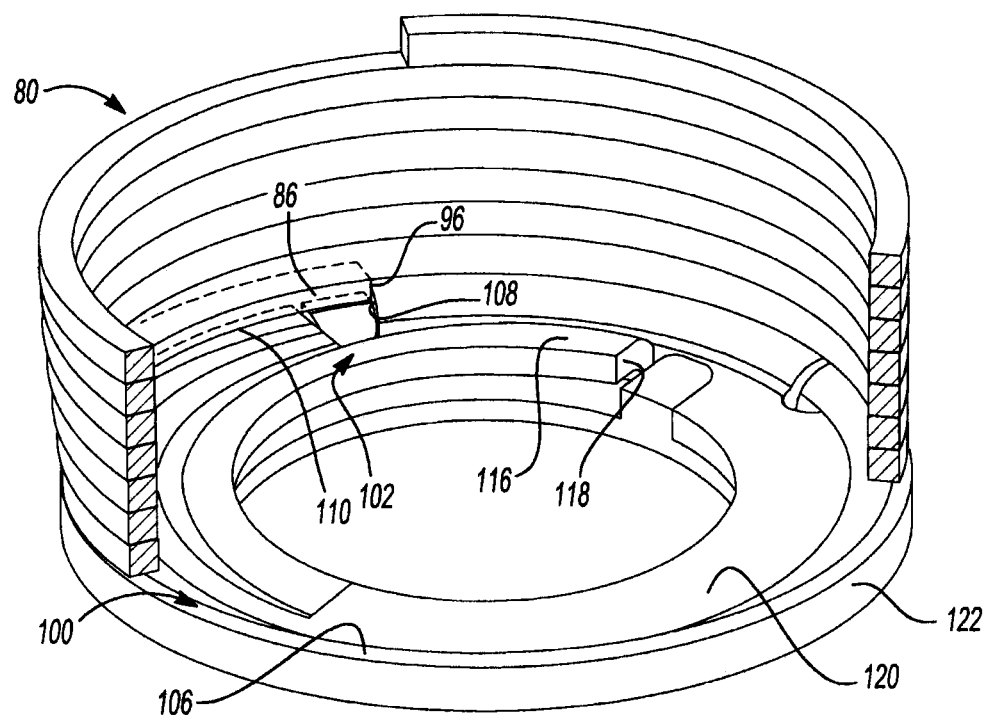
FIG. 5 is a perspective, partially sectioned view of a portion of the decoupler of FIG. 1 illustrating a spring carrier and a clutch spring in more detail.
Figure 6:
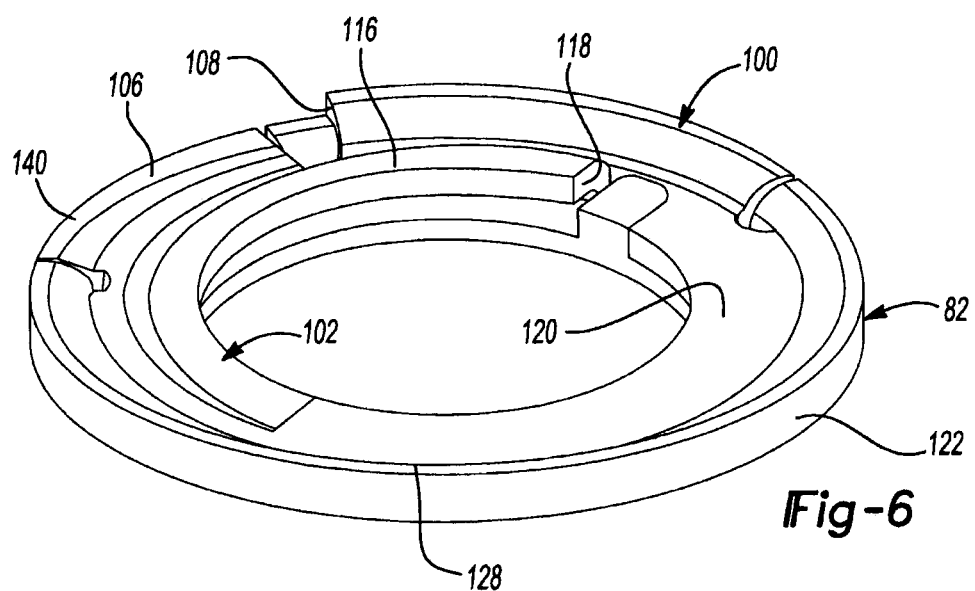
FIG. 6 is a perspective view of the spring carrier shown in FIG. 5.

With reference to FIGS. 5 and 6, the spring carrier 82 can comprise a clutch spring ramp 100 and a second torsion spring ramp 102. The clutch spring ramp 100 is configured to engage the clutch spring 80 and can comprise a clutch spring abutment surface 106 and a clutch drive face 108 (which may be referred to as a carrier clutch drive face 108). The clutch spring abutment surface 106 can be shaped in a helical manner and configured to abut a first axial end 110 of the clutch spring 80. The clutch drive face 108 can extend generally perpendicularly to the clutch spring abutment surface 106 and can engage the face 96 at the first helical end 86 of the clutch spring 80. The second torsion spring ramp 102 can be disposed radially inwardly of the clutch spring ramp 100 and can include a second spring abutment surface 116, which can be shaped in a helical manner that extends along the rotary axis 50, and a second spring drive face 118 (which may also be referred to as a torsionally-compliant member drive face 118 or as an isolation spring drive face 118) that can extend generally perpendicular to the second spring abutment surface 116.

With reference to FIGS. 2, 5 and 6, the spring carrier 82 can be formed in two (or more) pieces if desired. In the particular example provided, the spring carrier 82 comprises a carrier member 120 and a thrust member 122. The carrier member 120 can be formed of an appropriate steel material, such as a high-strength, low alloy steel that is strong and suitable for forming the carrier member 120 via stamping. The carrier member 120 can be configured to transmit force from the first helical end 86 of the clutch spring 80 to the torsionally-compliant member 40 and as such, it will be appreciated that the carrier member 120 defines or forms the second torsion spring ramp 102 and a portion of the clutch spring ramp 100 that includes the clutch drive face 108. The thrust member 122 can be formed of a suitable plastic, such as Nylon®, and can be configured to help center the spring carrier 82 relative to the rotary axis 50 and to contact the clutch drive surface 94 with a relatively lower coefficient of friction than that which is provided by the material from which the carrier member 120 is formed. The thrust member 122 can define the remainder of the clutch spring ramp 100 that is not formed by the carrier member 120. The thrust member can wrap around an outer radial edge 128 of a portion of the carrier member 120 (e.g., the outer radial edge 128 of a majority of the carrier member 120) to prevent or substantially limit contact between the portion of the carrier member 120 and the clutch drive surface 94.

With reference to FIGS. 2 through 4, the torsionally-compliant member 40 can be any type of device that can provide torsional compliance between the spring carrier 82 and the output member 32, such as one or more mechanical springs or resilient spring-like members. In the particular example provided, the torsionally-compliant member 40 comprises a helical torsion spring 130 that is formed of a spring-steel wire and wound in a direction opposite the direction in which the clutch spring 80 is wound. The torsion spring 130 has first and second helical ends 131 and 132, respectively, that are disposed generally perpendicular to the longitudinal axis of the wire that forms the torsion spring 130. The first helical end 131 is abutted against the first spring drive face 76 on the output member 32, while the second helical end 132 is abutted against the second spring drive face 118 (FIG. 6) on the carrier member 120.

With reference to FIGS. 2, 5 and 6, the helical coils 90 gather rotary power from the input member 30 during operation of the decoupler 10 (via contact between the helical coils 90 and the clutch drive surface 94) that is transmitted axially along the wire that forms the clutch spring 80 such that at least a portion of the rotary power is transmitted through the face 96 of the first helical end 86 to the clutch drive face 108 on the carrier member 120. The rotary power input to the carrier member 120 is output via the second spring drive face 118 to the torsion spring 130, which transmits the rotary power to the output member 32 (via the first spring drive face 76).

Figure 7:
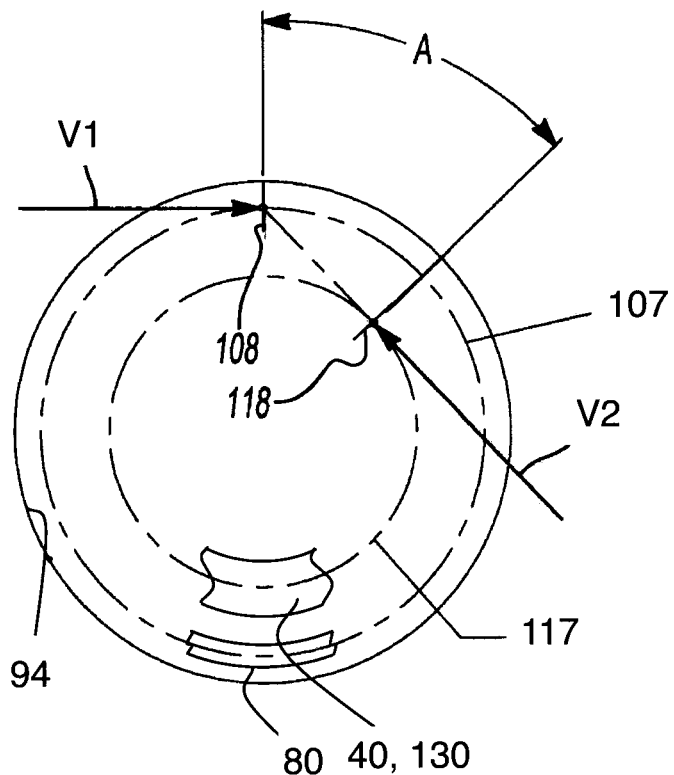
FIG. 7 is a diagram illustrating forces acting on the carrier shown in FIG. 5.

With reference to FIGS. 2, 6 and 7, it may be desirable in some situations to control the orientation or position of the second spring drive face 118 relative to the clutch drive face 108. As shown in FIG. 7 the wrap spring clutch drive face 108 receives a first vector force shown at V1 from an end (i.e. the face 96 at the first helical end 86) of the clutch spring 80. The first vector force V1 effectively acts at the mean clutch diameter (i.e. the mean diameter of the clutch spring 80, which is shown at 107 in FIG. 7). The vector force V1 is transmitted from the wrap spring clutch 80, through the carrier 120 and into the torsion spring 130 at the second spring drive face 118. Accordingly, a reaction force by the second helical end 132 of the torsion spring 130 results on the carrier member 120 and is shown as a second vector force V2, which effectively acts at the mean torsion spring diameter, shown at 117. Thus, the isolation spring drive face 118 receives a second vector force V2 from the isolation spring 40. The force V2 is related to the force V1 in the sense that the force V2 is a reaction force on the carrier 82 that results when the force V1 is applied to the carrier 82 by the wrap spring clutch 80. An included angle between the clutch drive face 108 and the second spring drive face 118 is shown at A.

By selecting the relative positions of the clutch drive face 108 and the second spring drive face 118 (which may, for example, be achieved by selecting the included angle A), the wrap spring clutch drive face 108 and the isolation spring drive face 118 can be arranged so as to direct the second vector force V2 to intersect with the first vector force V1 substantially at the wrap spring clutch drive face 108 as shown in FIG. 7. This controls a net force on the carrier 82 urging the carrier 82 towards engagement with the clutch drive surface 94, which could otherwise result if the vector forces V1 and V2 did not intersect substantially at the clutch drive face 108. Additionally, this can substantially eliminate tensile stresses on the carrier 82. By contrast, for decouplers in which the forces V1 and V2 do not intersect or do not intersect at the clutch drive face, the net force resulting from forces V1 and V2 can urge the carrier to sit eccentrically sufficiently to come into contact with the clutch drive surface of the input member. In some decouplers the carrier is formed from an abrasive material such as a glass filled plastic. As a result, the clutch drive surface could incur premature wear and or groove formation from the carrier, which can result in premature wear on other components of the decoupler and ultimately failure of the decoupler. Additionally, in a decoupler where the wrap spring clutch is welded or otherwise bonded to the carrier, if the drive faces 108 and 118 are not arranged advantageously as described herein, the resulting net force may be sufficiently high to cause stresses on the joint between the wrap spring clutch and the carrier, which can, after repeated occurrence, result in a fatigue failure at the joint.

Additionally, tensile stresses incurred by carriers have been found to result in shortened operating lives for the carriers. In other words, it has been found to be advantageous for the operating life of the carrier 82 if the forces V1 and V2 result substantially entirely in compressive loads and stresses on the carrier 82. It has been found that such is the case when the force V2 intersects the force V1 at the drive face 108.

In an embodiment, depending on the mean torsion spring and mean clutch spring diameters 117 and 107, the angle A may be about 43 degrees. In other embodiments, the angle A could be some other angle, and may, for example, be more than 43 degrees. It will be noted that the angle A may be selected (or, worded differently, the arrangement of the isolation spring drive face and the wrap spring clutch drive face may be selected) based at least in part on the mean wrap spring clutch diameter and the mean isolation spring diameter. It will be further noted that the mean isolation spring diameter depends in part on the torque being transferred through the isolation spring 40 at a given moment. As the torque transferred through it increases, the mean diameter of the isolation spring 40 increases. Experiments may be carried out to determine the most likely torque being transferred during operation of the decoupler 10 so as to determine the mean diameter of the isolation spring 40. Alternatively, the diameter of the isolation spring 40 may be considered, for simplicity, to be its diameter at rest.

Figure 8:
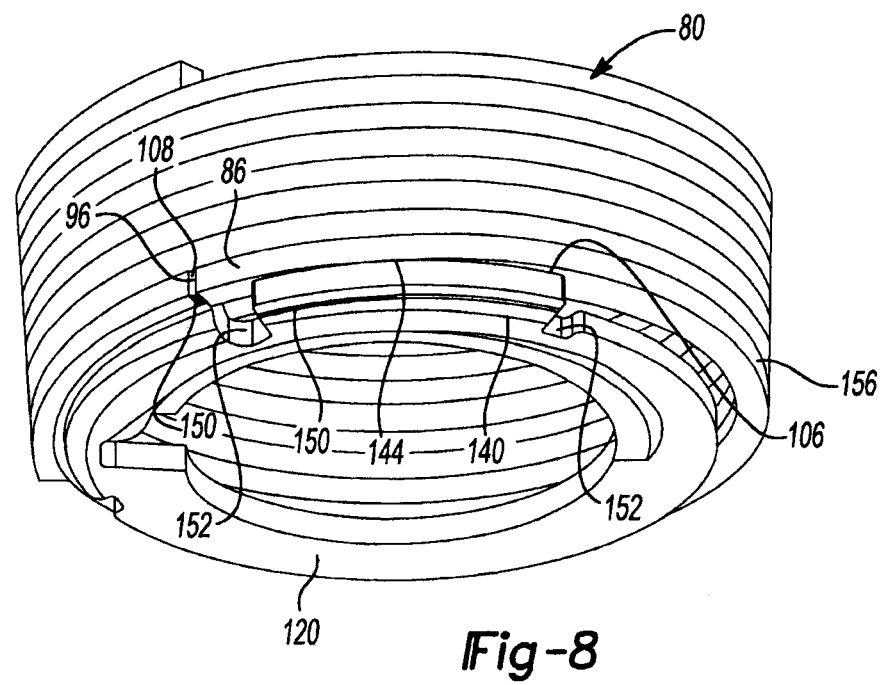
FIG. 8 is a perspective view illustrating the clutch spring and carrier shown in FIG. 5, with the clutch spring coupled to a portion of the spring carrier.

With reference to FIG. 8, the first helical end 86 of the clutch spring 80 can be fixedly coupled to the spring carrier 82 in any desired manner. In the particular example provided, the first helical end 86 is bonded to the carrier member 120. The first helical end 86 of the clutch spring 80 can be fixedly coupled to the carrier member 120 where the face 96 at the first helical end 86 and the clutch drive face 108 abut one another and/or along a portion of a side 144 of the wire that forms the first helical end 86 of the clutch spring 80 (i.e., a portion of the axial end of the clutch spring 80) where the axial end of the clutch spring 80 abuts the clutch spring abutment surface 106. For example, the carrier member 120 can include an abutment tab 140 that can form a portion of the clutch spring abutment surface 106 and the side 144 of the wire that forms the first helical end 86 of the clutch spring 80 can be bonded to the abutment tab 140 over a desired portion of the width of the abutment tab 140, such as approximately one-half the width of the abutment tab 140. If desired, the abutment tab 140 can be sized to flex in a circumferential direction (under expected loading of the decoupler 10) toward and/or away from the clutch spring abutment surface 106 to reduce stress on the bond 150 between the first helical end 86 and the abutment tab 140. If desired, grooves or notches 152 can be formed in the carrier member 120 to provide the abutment tab 140 with a desired degree of compliance in the circumferential direction due to loading of the abutment tab 140 from force transmitted through the first helical end 86.

Figure 9:
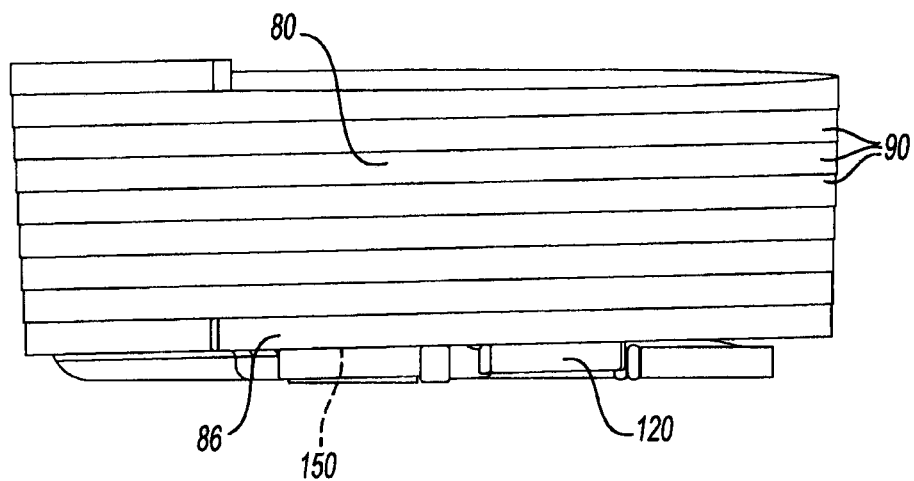
FIG. 9 is a side elevation view illustrating the clutch spring and carrier shown in FIG. 5, with the clutch spring coupled to a portion of the spring carrier.
Figure 10:
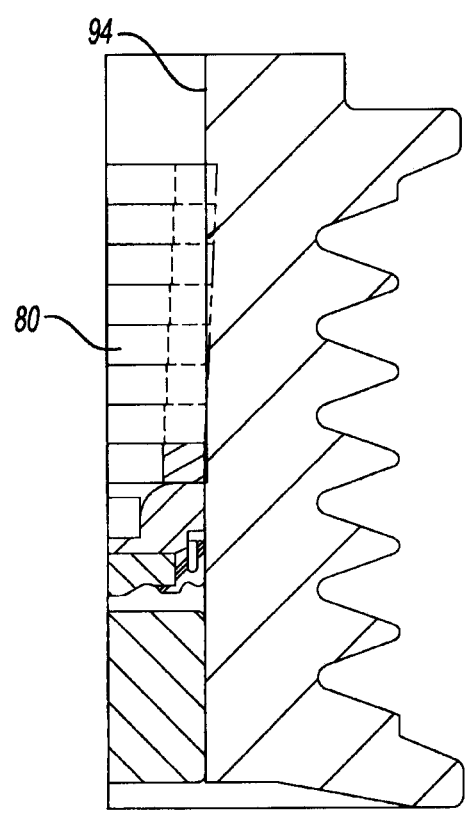
FIG. 10 is a portion of a longitudinal section view of the decoupler of FIG. 1 illustrating the clutch spring as engaged to an input member of the decoupler.

With reference to FIGS. 9 and 10, the clutch spring 80 can be sized to contact the clutch drive surface 94 in an interference fit or press fit manner. For example, the clutch spring 80 can be sized and shaped in a generally cylindrical manner such that the outside diameter of the clutch spring 80 is larger than the diameter of the clutch drive surface 94. Alternatively, the clutch spring 80 can be sized and shaped to reduce or eliminate stress on the bond between the first helical end 86 and the carrier member 120 when the clutch spring 80 is inserted into the input member 30. For example, the clutch spring 80 can have a stepped diameter in which a first portion of the clutch spring 80 (i.e., a portion that includes the first helical end 86) is sized in a line-to-line manner with the clutch drive surface 94 and one or more other portions of the clutch spring 80 are sized larger in diameter so that at least a portion of the clutch spring 80 has an outside diameter that is greater than the diameter of the clutch drive surface 94. As another example, the clutch spring 80 can be tapered as shown in FIGS. 9 and 10 such that at least the first helical end 86 is sized in a line-to-line manner with the clutch drive surface 94 and at least a portion of the remainder of the clutch spring 80 is sized progressively larger in diameter so that a portion of the helical coils 90 are sized larger in diameter than the clutch drive surface 94. Construction in this manner configures the clutch spring 80 in a self-energizing manner in which the coils 98 of the clutch spring 80 tend to expand radially outwardly to thereby more securely engage the clutch drive surface 94 when load is transmitted through the clutch spring 80.

The thrust plate 42 can be fixedly coupled to the hub 60 and can abut a rear axial side of the spring carrier 82. The thrust plate 42 can be positioned axially along the hub 60 so as to compress the torsionally-compliant member 40 to a desired extent.

The seals 44 can be employed to seal a chamber that extends radially between the hub 60 and the input member 30 and axially between the thrust plate 42 and the annular collar 64. In the particular example provided, a first one of the seals 44 is mounted to the annular collar 64 and sealingly engages both the annular collar 64 and the clutch drive surface 94, while a second one of the seals 44 is mounted to the thrust plate 42 and sealingly engages the thrust plate 42 and the clutch drive surface 94. Construction in this manner may be advantageous, for example, when the interface between the clutch spring 80 and the clutch drive surface 94 is lubricated by a substance (e.g., oil, grease, dry-film lubricant, traction fluid) that is not compatible with a lubricant that is employed to lubricate the second bearing 36. The seals 44 can be any type of seal, such as a lip seal.

The front cover assembly 46 can comprise first and second cap members 160 and 162, respectively. The first cap member 160 can be formed of a suitable metal (e.g., steel stamping) or plastic and can be press-fit to the central bore 52 in the input member 30. In the example provided, the first cap member 160 comprises a radially-extending portion 170 that terminates at a circumferentially-extending rim member 172 that engages the inside surface of the central bore 52 in a press-fit manner. The radially extending portion 170 can define a cap aperture 176 that is sized to permit a tool (not shown) to be received therethrough to engage the tool-engaging portion 70 of the output member 32. The second cap member 162 can be configured to engage the first cap member 160 in a snap-fit manner to close the cap aperture 176. In the example provided, the second cap member 162 comprises a plate portion 180 and a plurality of barbed fingers 182 that extend axially rearward therefrom. Each of the barbed fingers 182 is configured with a ramp surface 186 and an abutment surface 188. The ramp surfaces 186 are configured to deflect the barbed fingers 182 radially inwardly in response to contact with an edge of the cap aperture 176. The abutment surfaces 188 are configured to abut a rear surface 190 of the first cap member 160 when the ramp surfaces 186 have been pushed completely through the cap aperture 176 and have disengaged the edge of the cap aperture 176.

With reference to FIGS. 2 through 4, the bearing shield 48 can be received onto the hub 60 rearwardly of the second bearing 36 and can be configured to shield a bearing 200 in the housing 202 of the engine accessory 16a that supports the input shaft 204 of the engine accessory 16a. The bearing shield 48 can be formed of a suitable plastic, such as high-temperature polyphenylene sulfide (PPS), and can include a mounting portion 210 that can define a hub aperture 212 and a plurality of mounting ribs 214 that can be disposed around the circumference of the hub aperture 212. The hub aperture 212 can be sized larger in diameter than the outside diameter of the hub 60, while the mounting ribs 214 can be sized to crush or permanently deform as they engage the outside diametrical surface of the hub 60 in a press-fit manner. The mounting ribs 214 can be relatively narrow in width to limit the surface area over which the bearing shield 48 contacts the hub 60 so as to reduce the deformation of the hub 60 (i.e., particularly the shaft-centering portion 66) relative to a prior art bearing shield (not shown), which is formed of steel and would contact the hub 60 over its entire circumference. A plurality of annular pockets or channels 220 can be formed into the bearing shield 48 and can be employed to reduce the material in the bearing shield 48, and/or to reduce stress associated with thermal expansion as the annular channels 220 permit the bearing shield 48 to flex.

Figure 11:
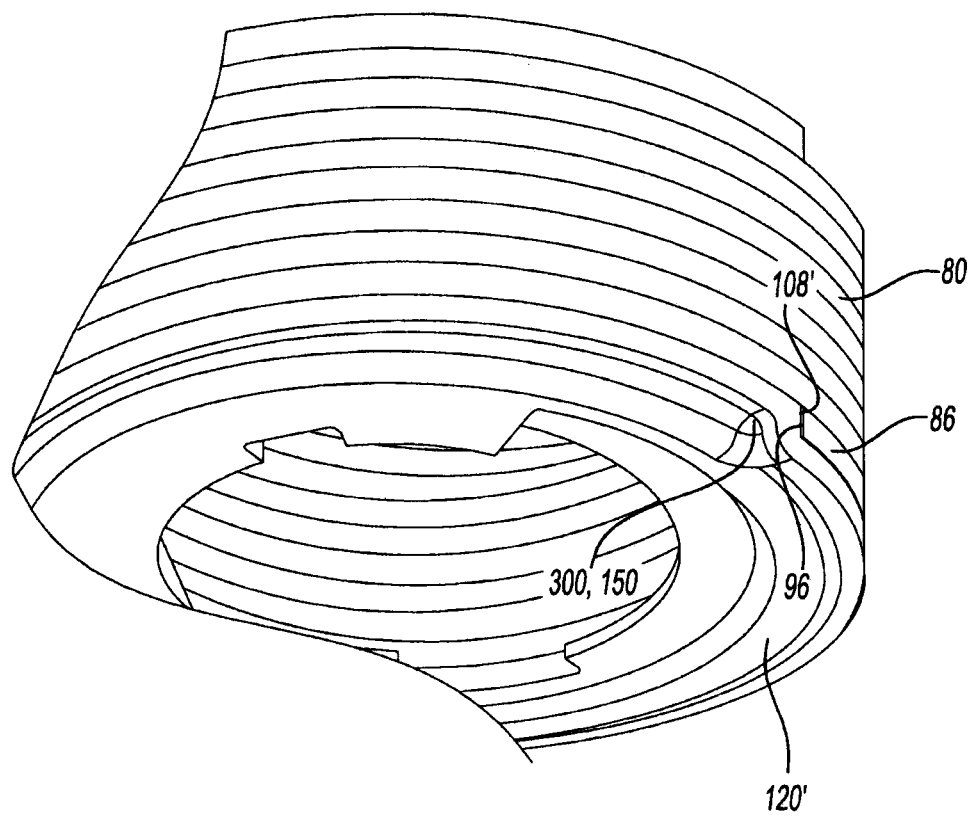
FIG. 11 is a perspective view of a clutch spring and an alternately constructed spring carrier.

In FIG. 11 an alternatively constructed carrier member 120' is illustrated. The carrier member 120' includes an axially indented portion 300 that is configured to form the clutch drive face 108'. Moreover, the bond 150 could be formed through the axially indented portion 300 to fixedly couple the face 96 of the clutch spring 80 to the clutch drive face 108'.

Figure 12:
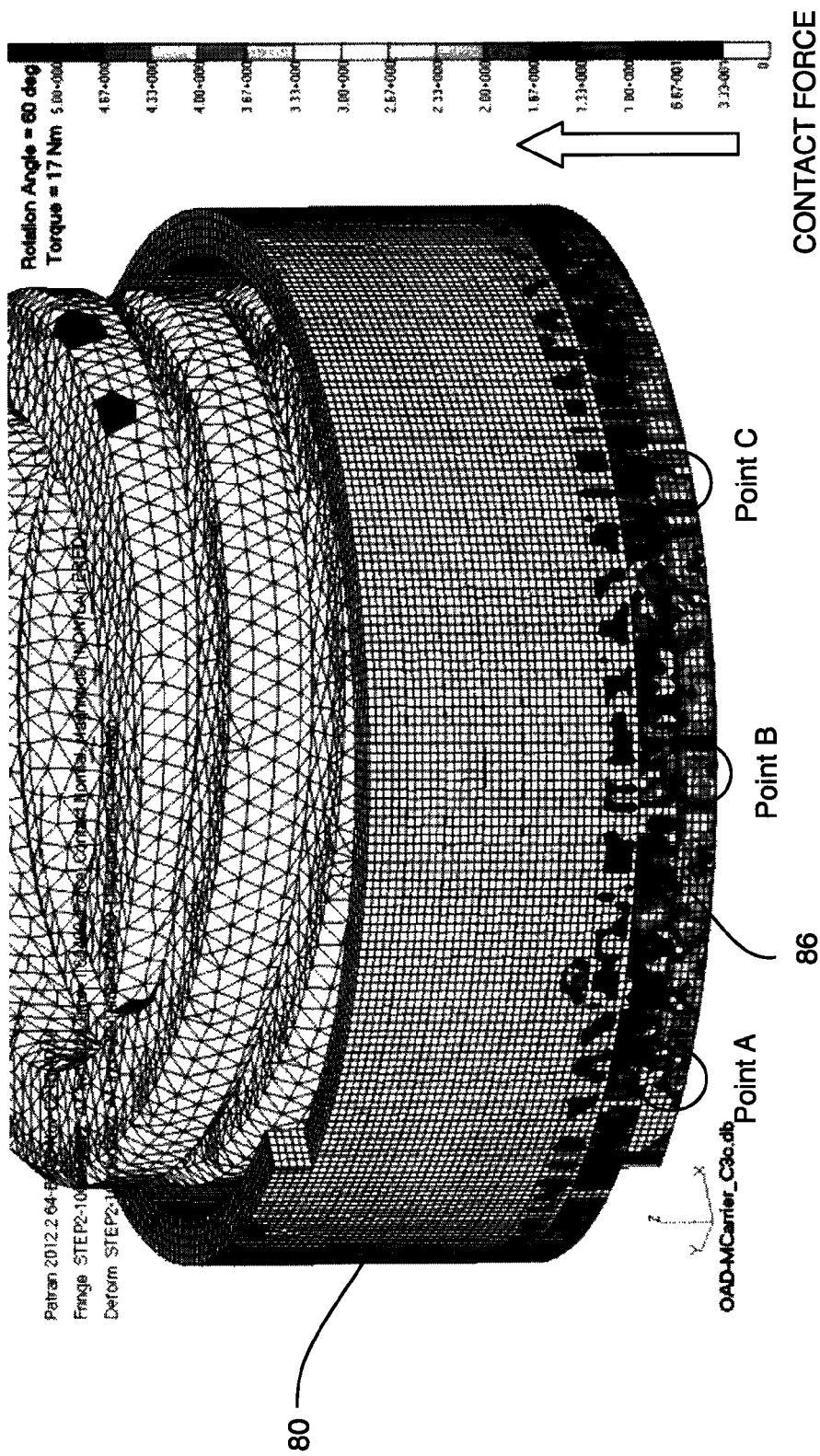
FIG. 12 is a perspective view of a portion of the decoupler of FIG. 1 illustrating the clutch spring.
Figure 13:
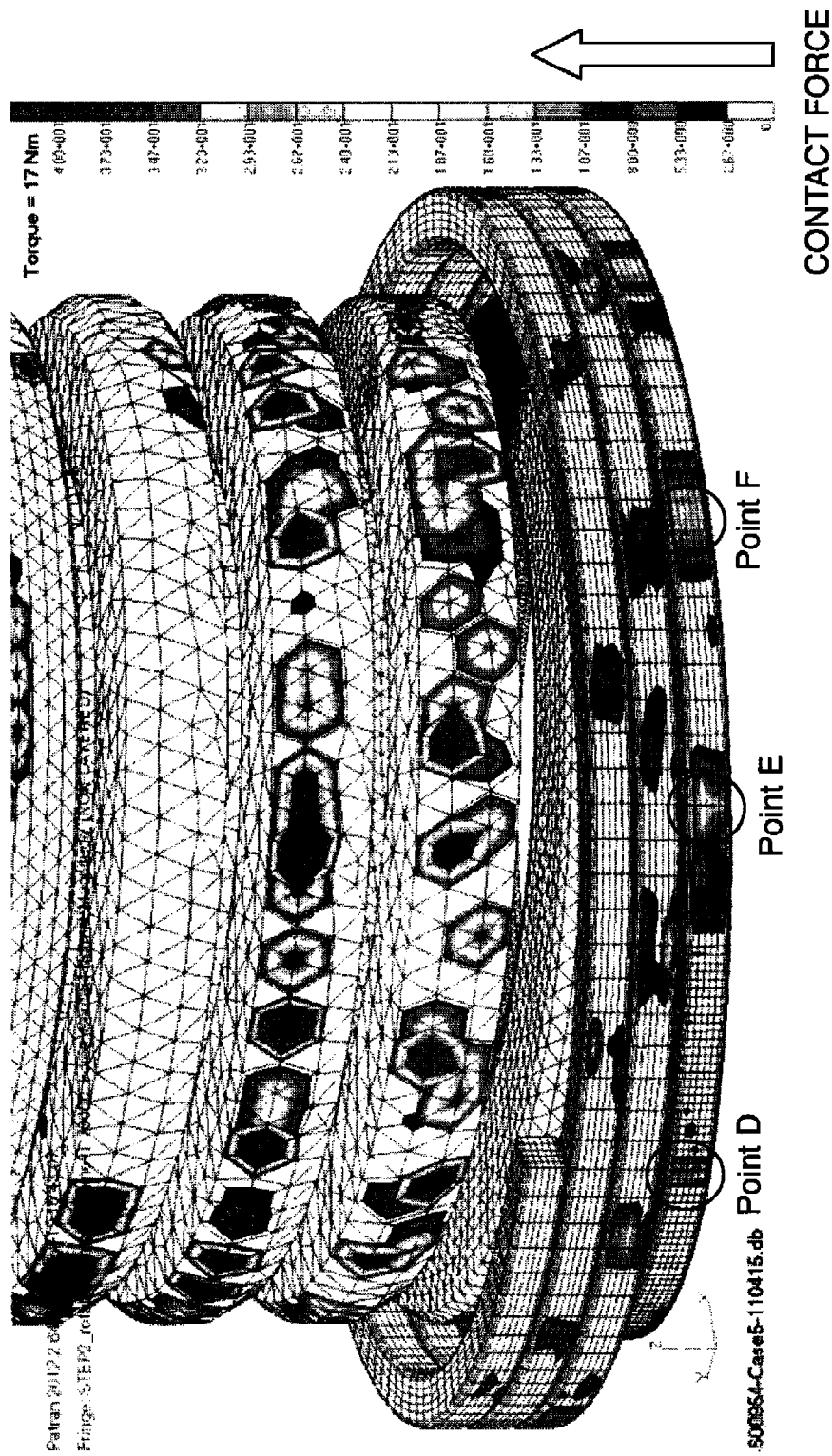
FIG. 13 is a perspective view similar to that of FIG. 12 but depicting a prior art decoupler.
Figure 14:
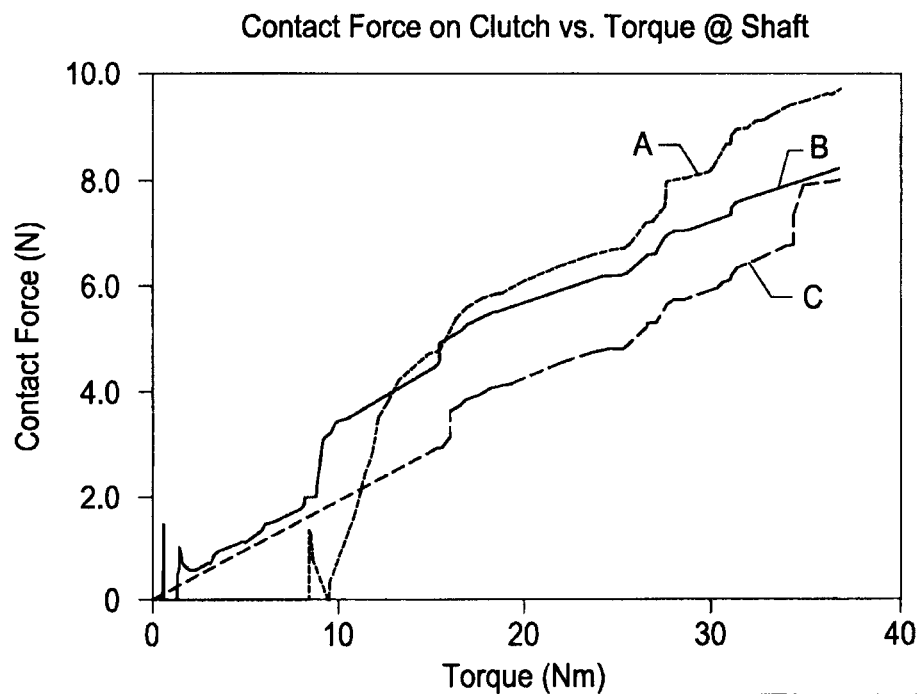
FIG. 14 is a plot showing contact force on the first helical end of the clutch spring as a function of the output torque of the decoupler of FIG. 1.
Figure 15:
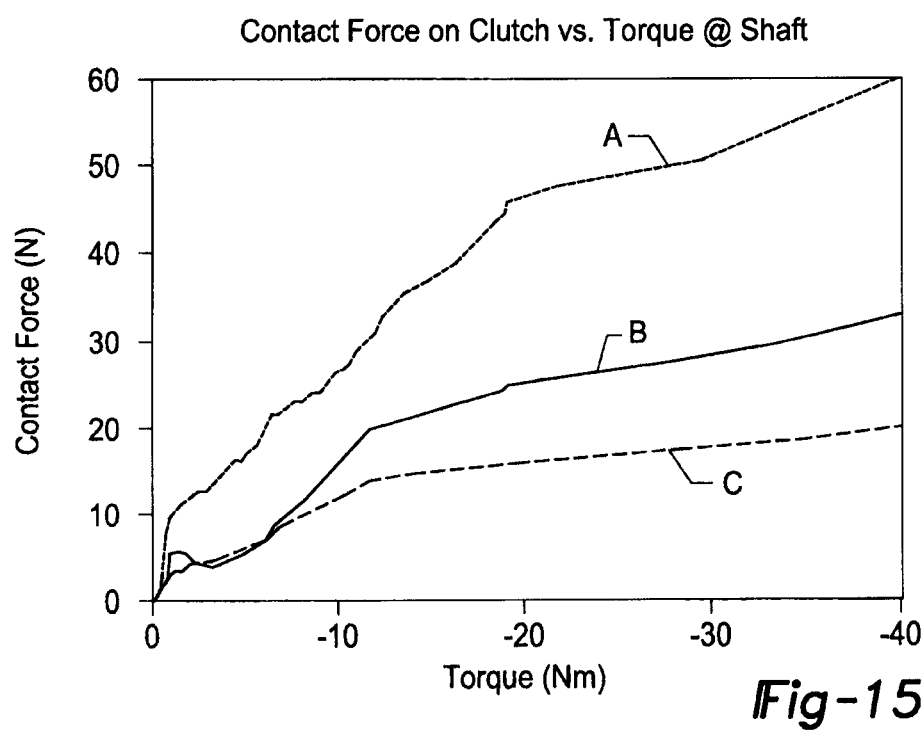
FIG. 15 is a plot similar to that of FIG. 14 but for a prior art decoupler.

We have found that the helical configuration of the entirety of the first helical end 86 of the clutch spring 80 distributes load transmitted between the first helical end 86 and the clutch drive surface 94 (i.e., the contact force) in a more even manner and lowers these loads relative to a prior art decoupler. In FIG. 12, the contact force at points A, B and C on the first helical end 86 of the clutch spring 80 were calculated via finite element analysis as a function of the torque output by the decoupler 10 (FIG. 2) and the results are shown in the plot of FIG. 14. For purposes of comparison and with reference to FIG. 13, the contact force at points D, E and F on a clutch spring of a prior art decoupler was calculated in a similar manner and the results are shown in the plot of FIG. 15. Those of skill in the art will appreciate that for both examples, there are areas proximate the three points where the clutch spring is not loaded (i.e., the contact force at those points is zero (0) N). As is apparent, the maximum contact force on the first helical end 86 of the clutch spring 80 is significantly lower than that for a prior art decoupler. For example, the contact force on the first helical end 86 of the clutch spring 80 is less than or equal to 10 N when a load of 20, 30 or 40 Nm is output by the decoupler 10 (FIG. 2). As another example, the contact force at any two points on the first helical end 86 of the clutch spring 80 differs in an amount that is less than or equal to 10N.

Figure 16:
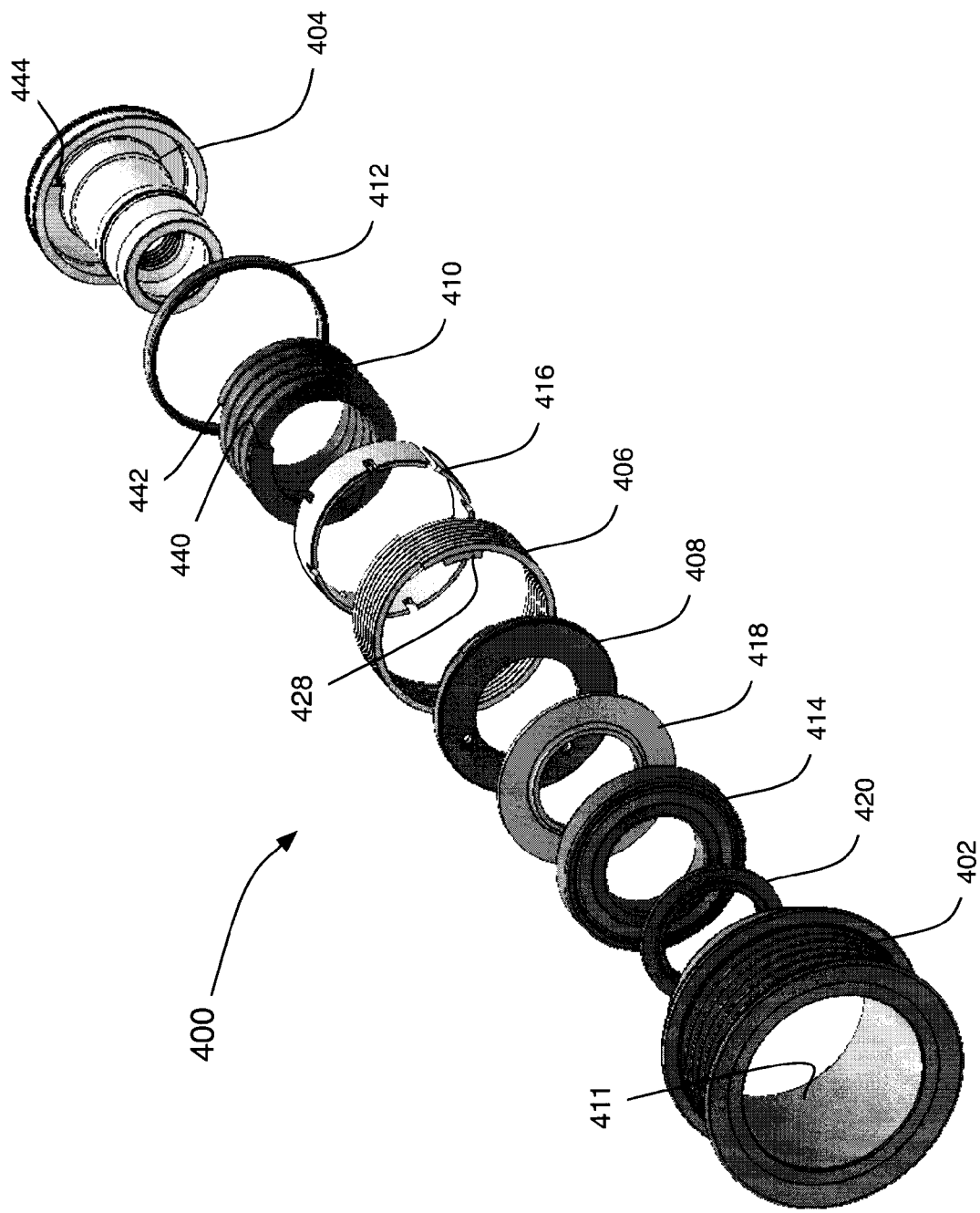
FIG. 16 is an exploded perspective view of a decoupler in accordance with another embodiment of the present disclosure.
Figure 17:
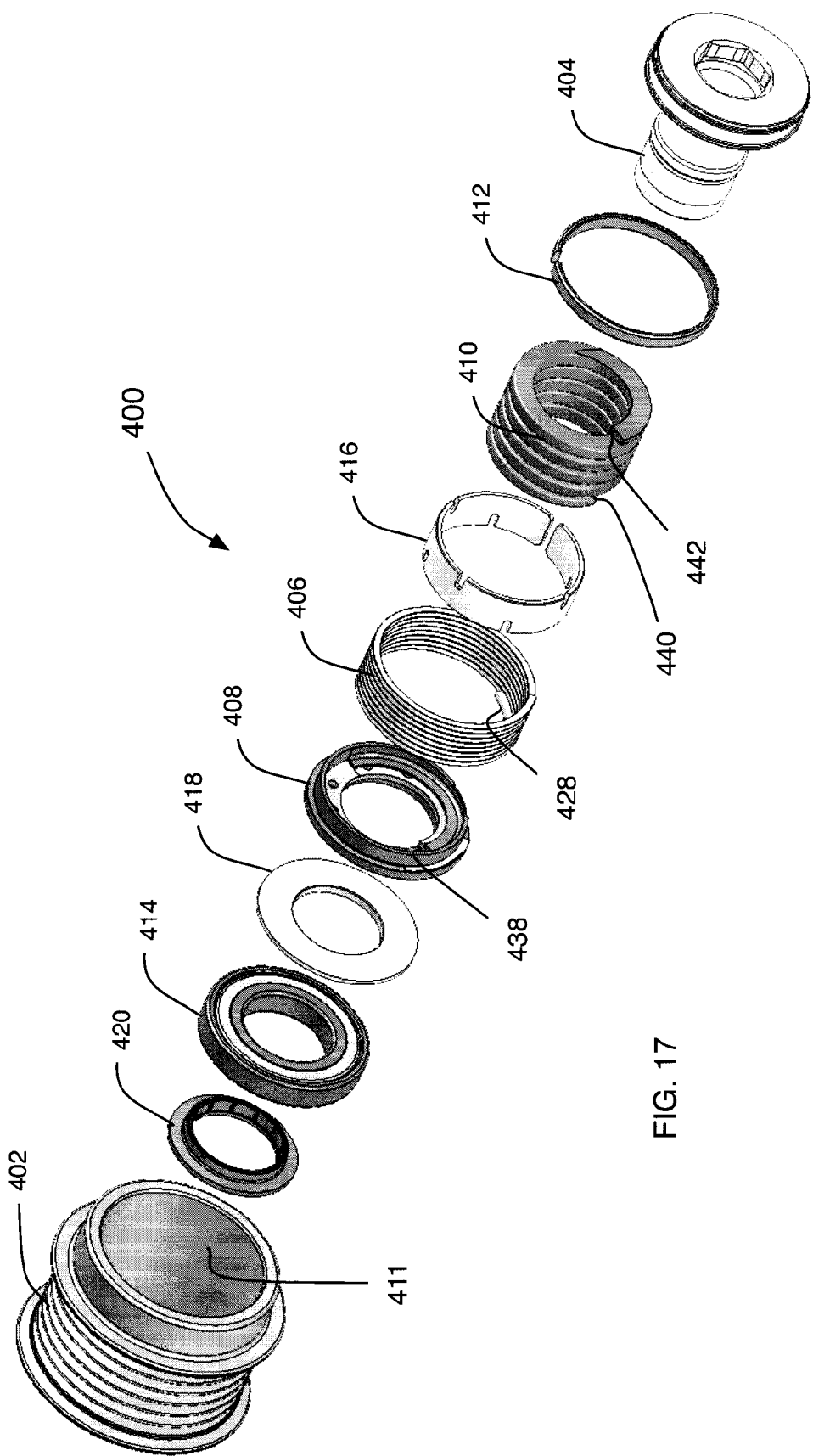
FIG. 17 is another exploded perspective view of the decoupler shown in FIG. 16.

Reference is made to FIGS. 16-23 which show a decoupler 400 in accordance with another embodiment of the present invention. Referring to FIGS. 16 and 17, the decoupler 400, which may be similar to the decoupler 10, includes an input member 402, an output member 404, a wrap spring clutch 406, a carrier 408 and an isolation spring 410 (e.g. a helical torsion spring), a first bearing 412 (which may be a bushing) and a second bearing 414 (which may be a ball bearing) for rotatably supporting the input member 402 on the output member 404. A sleeve 416 is provided between the isolation spring 410 and the wrap spring clutch 406, and limits the amount of torque that can be transmitted through the isolation spring 410 by limiting the amount of radial expansion that is available to the spring 410. A thrust plate 418 is provided between the bearing 414 and the carrier 408. A bearing shield 420 is provided which may be similar to bearing shield 48.

Figure 18:
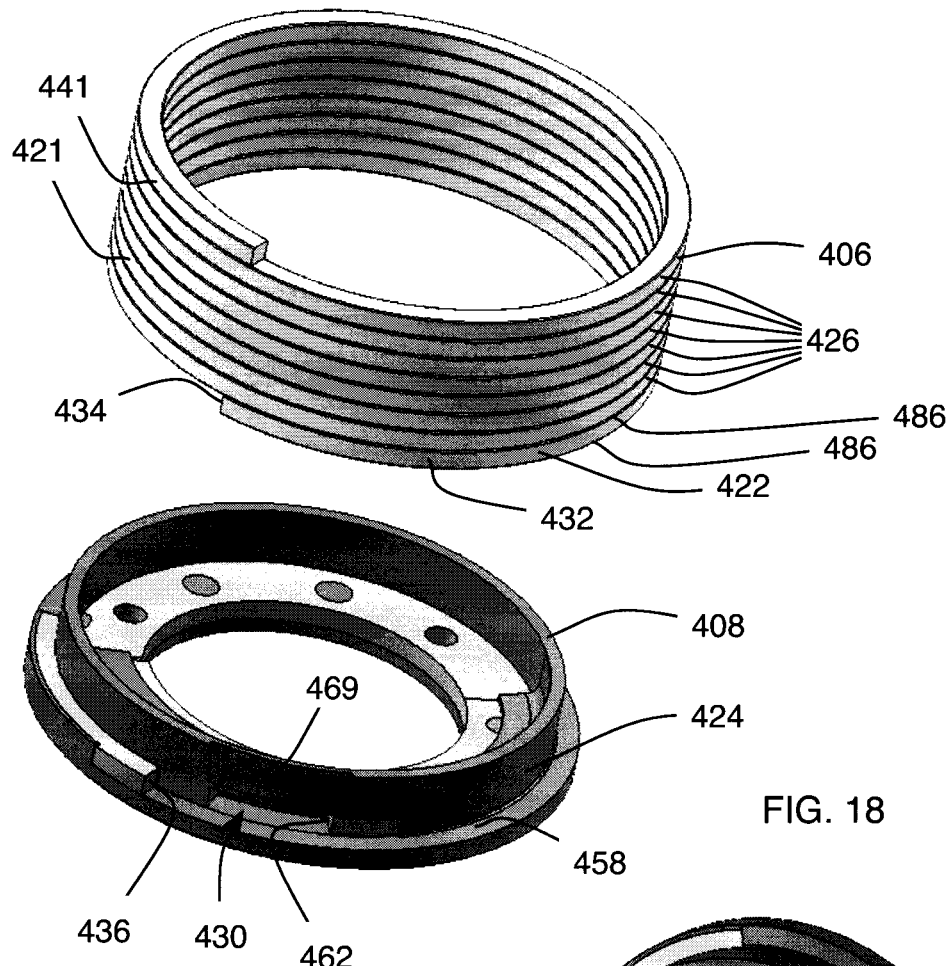
FIG. 18 is an exploded perspective view of a wrap spring clutch and a carrier from the decoupler shown in FIG. 16.
Figure 19:
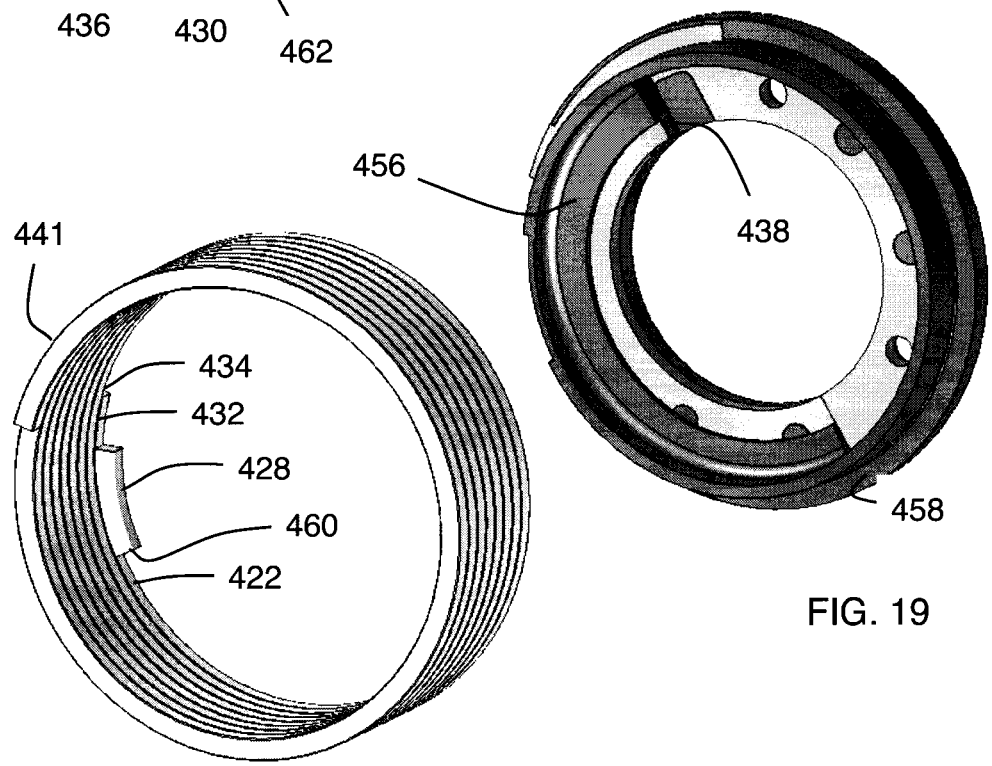
FIG. 19 is another exploded perspective view of the wrap spring clutch and carrier from the decoupler shown in FIG. 16.
Figure 20:
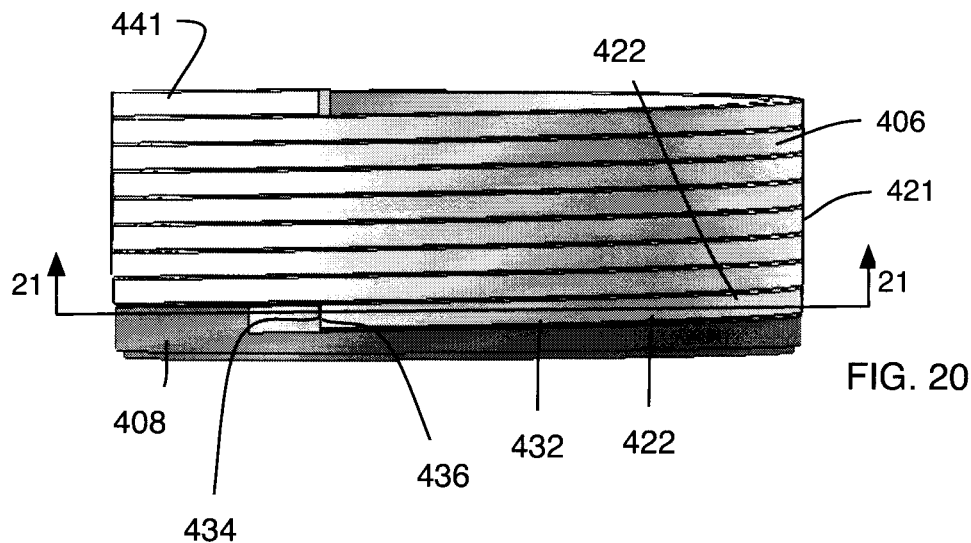
FIG. 20 is a side view of the wrap spring clutch and carrier mounted together.
Figure 21:
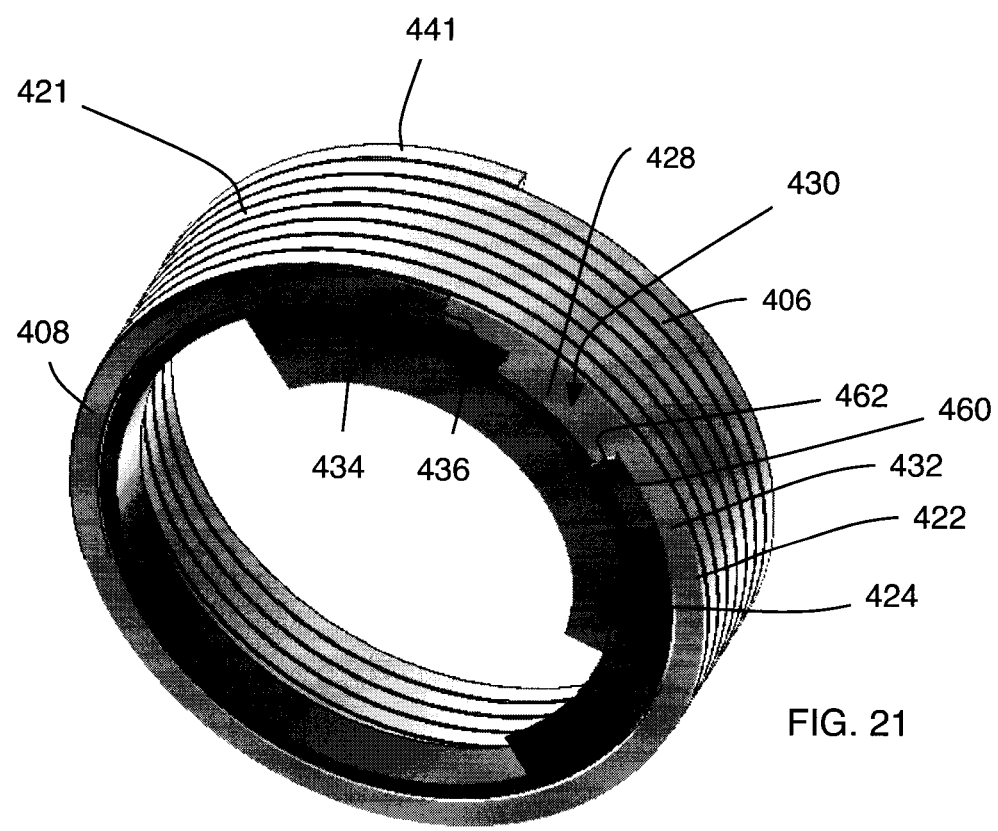
FIG. 21 is a sectional perspective view along section lines 21-21 in FIG. 20.

Torque is transferred from the input member 402 to the output member 404 serially through the wrap spring clutch 406, the carrier 408, and the isolation spring 410, optionally in that order. Driving of the wrap spring clutch 406 by the input member 402 may be by engagement of a clutch drive surface 411 on the input member 402 with the radially outer surface 421 of the wrap spring clutch 406. The clutch drive surface 411 may also be referred to as a radial clutch drive surface 411. Referring to FIGS. 18 and 21, a first helical end 432 of the wrap spring clutch 406 has a face 434 that is engaged with a carrier clutch drive face 436 on the carrier 408. A second helical end of the wrap spring clutch 406 is shown at 441. Referring to FIGS. 17 and 19, the carrier 408 further includes an isolation spring drive face 438 that is engaged with a face 440 (FIG. 17) at a helical end of the isolation spring 410. A face 442 at the other helical end of the isolation spring 410 is engaged with another isolation spring drive face 444 on the output member 402. The face 442 on the isolation spring may be referred to as a face 442 at a first helical end of the isolation spring 410. The face 440 on the isolation spring 410 may be referred to as a face 440 at a second helical end of the isolation spring 410. The drive face 444 may be referred to as the first isolation spring drive face and the drive face 438 may be referred to as a second isolation spring drive face.

Instead of having a wrap spring clutch that is bonded or welded or otherwise fixedly joined to a carrier, the decoupler 400 has its wrap spring clutch 406 rotationally fixed to the carrier 408 in a different way. Referring to FIG. 19, a first portion 422 towards the first helical end 432 of the wrap spring clutch 406 is configured to have an inner diameter at rest that is smaller than the outer diameter of a clutch grip surface 424 on the carrier 408. In an embodiment, the first portion 422 includes about one coil 425 of the wrap spring clutch 406. A second portion 426 has an inner diameter that is larger than that of the first portion 422. As a result, when the wrap spring clutch 406 is mounted to the carrier 408 there is an interference fit which causes the wrap spring clutch 406 to maintain a grip on carrier 408 even when the second portion 426 is expanded and grips the clutch drive surface 411. The coils that make up the second portion 426 do not have an interference fit with the clutch grip surface 424 and may have an outer diameter that is larger than the inner diameter of the clutch drive surface 411 on the input member 402 (FIG. 16) so as to have an interference fit therewith.

Another feature that rotationally fixes the wrap spring clutch 406 to the carrier 408 is an overrun locking member 428 shown in FIG. 19 that is received in an overrun locking aperture 430 (shown in FIG. 18) in the carrier 408. When received in the aperture 430, a wrap spring clutch overrun drive face 460 is engaged with a carrier overrun drive face 462. The overrun locking feature 428 may be a small arcuate section of the same wire that the wrap spring clutch 406 is made from, which is welded to the radially inner surface of the first coil 422 of the wrap spring clutch 406. When the decoupler 400 is operated in a second mode, in which the output member 404 overruns the input member 402, the output member 404 rotates in the first rotational direction relative to the input member 402. This second mode can, for example, arise by a deceleration of the input member 402 relative to the output member 404 (e.g. a momentary deceleration due to a torsional vibration).

In a situation where the rotational speed of the decoupler 10 is sufficiently high it has been found that, upon a transition from the first mode to the second mode, there is a moment during which the first portion of the wrap spring clutch 406 may not apply a constrictive force on the carrier 408. During such a moment, if there were no other structure to keep the wrap spring clutch 406 rotationally fixed with the carrier 408 the carrier 408 could rotate relative to the wrap spring clutch 406, resulting in a separation of the drive face 436 from the face 434 at the first helical end 432. When the decoupler 400 would return to the first mode, the wrap spring clutch 406 would then be driven by the input member 402 until the face 434 impacted into the drive face 436, which can result in stress and ultimately failure of the wrap spring clutch 406 or the carrier 408.

Referring to FIG. 21, because of the engagement of the wrap spring clutch overrun drive face 460 with the carrier overrun drive face 462 the face 434 at the first helical end 432 is kept substantially in engagement with the drive face 436 on the carrier 408. It will be noted that there may be a small amount of clearance between the overrun locking member 428 and the overrun locking aperture 430, permitting a small amount of relative movement of the carrier 408 from the wrap spring clutch 406, however, even with such clearance, the face 434 at the first helical end 432 of the wrap spring clutch 406 may still be considered substantially engaged with drive face 436 on the carrier 408 even though there may be a very small spacing between them. Routine experimentation may be used to determine a suitable spacing that can still be considered substantial engagement between the face 434 at the first helical end 432 and the drive face 436. In at least some embodiments, the clearance may be less than about a millimeter.

Referring to FIG. 18, in order to facilitate the engagement of the assembly of the wrap spring clutch 406 with the carrier 408, the carrier 408 may include a lead in section 469 that is tapered relative to the grip surface 424. Additionally, the lead in section serves to provide an indicator as to how to rotationally align the wrap spring clutch 406 with the carrier 408 when assembling the two together.

Figure 22:
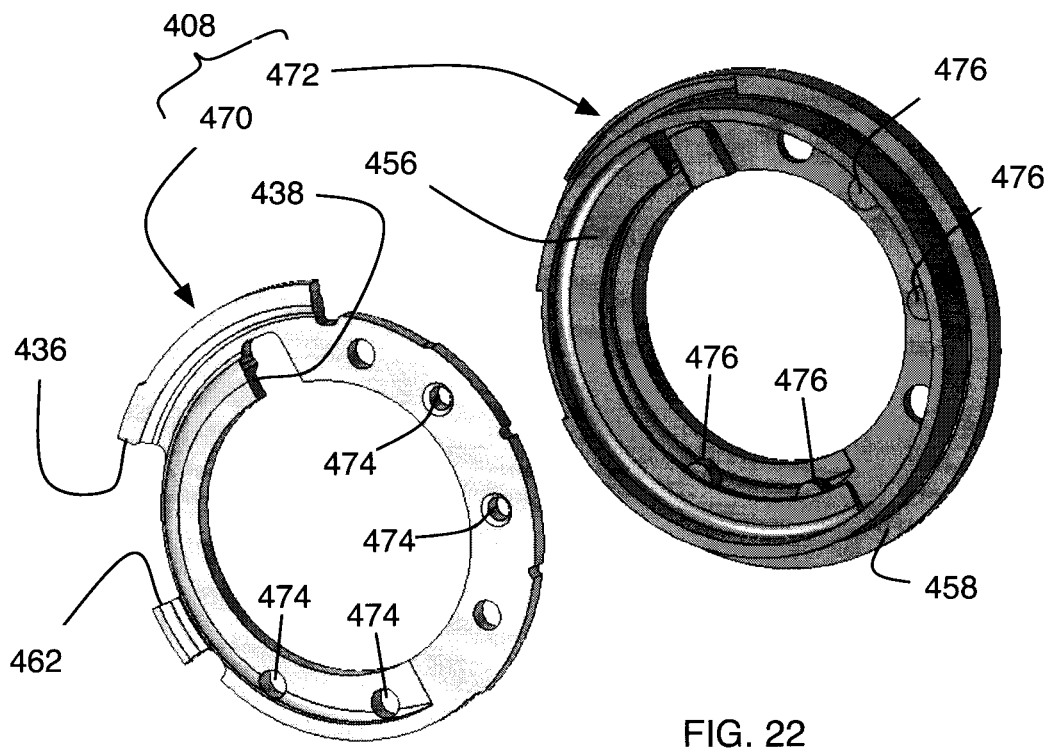
FIG. 22 is an exploded view of the carrier shown in 18.

Referring to FIG. 22, the carrier 408 may be formed from two members, namely a core member 470 that may be made from a first, relatively strong and hard material such as a suitable metal, such as a suitable steel, and a cover member 472 made from a second, relatively softer material such as a suitable polymeric material, such as a suitable nylon. The core member 470 defines at least a portion of the drive faces 436, 438 and 462. The cover member 472 is provided to reduce noise during engagement of the wrap spring clutch 406 with the carrier 408 and during engagement of the isolation spring 410 and the carrier 408. A helical ramp 456 which engages an axial end of the isolation spring 410 and a helical ramp 458 which engages a first axial end of the wrap spring clutch 406 are provided on the cover member 472. The cover member 472 may be formed by an overmolding process on the core member 470. Locking apertures 474 and locking bosses 476 may be provided on the core member 470 and cover member 472 respectively to assist in securing the cover member 472 to the core member 470.

Figure 23:
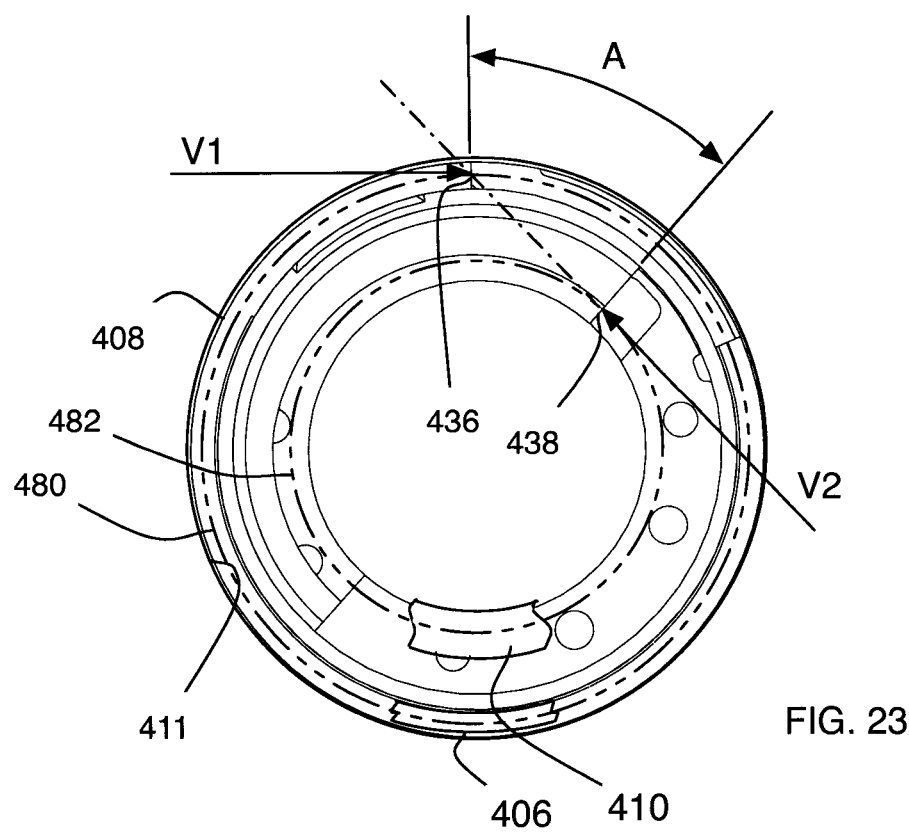
FIG. 23 is a diagram illustrating forces acting on the carrier shown in FIG. 18.

Referring to FIG. 23, the face 434 at the first helical end 432 of the wrap spring clutch 406 applies a vector force V1 on the drive face 436 of the carrier 408 at a mean wrap spring clutch diameter 480, and the helical end 440 of the isolation spring 410 applies a vector force V2 (a reaction force) on the drive face 438 of the carrier 408 at a mean isolation spring diameter 482. The vector force V2 may intersect the vector force V1 substantially at the drive face 436 to similar advantage as is described above in relation to FIG. 7. One difference, however, is that, because the wrap spring clutch 406 is not joined (e.g. welded or bonded) to the carrier 408, there are no joint stresses that would be reduced from the arrangement of the drive faces 436 and 438 since there is no fixed joint as there is in the embodiment described in FIG. 7. As a result of the arrangement of the drive faces 436 and 438 (which may be based on mean diameters 480 and 482, and which may result in a selected included angle A such as about 43 degrees, between the drive faces 436 and 438), there is a reduced likelihood of a net force resulting on the carrier 408 that would cause contact by the carrier 408 with the clutch drive surface 411 and consequent wear thereof.

For greater certainty, while the input member 30, 402 has been shown as being a belt-driven pulley and the output member 32, 404 has been shown to be a shaft-connection member that connects to a shaft of an accessory, it will be understood that the decoupler could be configured such that the input member could be a shaft-connection member for connection to a shaft (e.g. a crankshaft from an engine) and the output member could be a pulley that drives a belt or the like.

While the wrap spring clutch 80, 406 has been described as having a first portion that applies a constrictive force on the carrier 82, 408, and a second portion that has an interference fit with the clutch drive surface 94, 411, it will be understood that the second portion of the wrap spring clutch 80, 406 may have a larger diameter than the first portion, but may not have a diameter large enough to provide an interference fit with the clutch drive surface.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A decoupler, comprising:
an input member (30, 402);
an output member (32, 404); and
a torsional isolation spring (40, 410), a carrier (82, 408), and a wrap spring clutch (80, 406) configured to operate in a first mode in which rotary power is transmitted in a first rotational direction from the input member to the output member serially through the wrap spring clutch, the carrier, and the isolation spring, and a second mode in which the output member overruns the input member in the first rotational direction,
wherein the carrier has a carrier clutch drive face (108, 436) that receives a first vector force (V1) from a face (96, 434) at a helical end (86, 432) of the wrap spring clutch, and an isolation spring drive face (118, 438) that receives a second vector force (V2) from a face (132, 440) at a helical end of the isolation spring, wherein the carrier clutch drive face and the isolation spring drive face are arranged so as to direct the second vector force to intersect with the first vector force substantially at the carrier clutch drive face,
wherein the helical end of the wrap spring clutch extends along a helical path that substantially matches a helical path of a coil of the wrap spring clutch immediately adjacent the helical end, and, wherein the helical end is a terminal end of the wrap spring clutch.

2. The decoupler of claim 1, wherein the carrier clutch drive face and the isolation spring drive face have a selected included angle (A) therebetween.

3. The decoupler of claim 1, wherein the wrap spring clutch has a mean wrap spring clutch diameter and the isolation spring has a mean isolation spring diameter, and wherein the carrier clutch drive face and the isolation spring drive face are arranged based at least in part on the mean wrap spring clutch diameter and the mean isolation spring diameter.

4. The decoupler of claim 1, wherein the wrap spring clutch is positioned outboard of the isolation spring.

5. The decoupler of claim 1, wherein the carrier includes a core member that is made from a metal and a cover member that at least partially covers the core member and that is made from a polymeric material.

6. The decoupler of claim 5, wherein the core member defines at least a portion of the carrier clutch drive face and at least a portion of the isolation spring drive face.

7. The decoupler of claim 1, wherein a first portion (422) of the wrap spring clutch is sized smaller in diameter than a second portion (426) of the wrap spring clutch, wherein the first portion of the wrap spring clutch includes the helical end and is engaged in an interference fit with the carrier.

8. The decoupler of claim 7, wherein the second portion of the wrap spring clutch is engaged in an interference fit with the input member.

9. The decoupler of claim 1, wherein the isolation spring is a helical torsion spring.

10. The decoupler of claim 1, wherein the helical end of the wrap spring clutch is rotationally fixed with the carrier.

11. The decoupler of claim 10, wherein the wrap spring clutch includes a wrap spring clutch overrun drive surface (460) that is engageable with a carrier overrun drive surface (462) on the carrier when the output member overruns the input member to keep the helical end of the wrap spring clutch rotationally fixed with the carrier.

12. The decoupler of claim 10, wherein the helical end of the wrap spring clutch is joined to the carrier by welding or bonding.

13. A decoupler, comprising:
an input member (30, 402);
an output member (32, 404); and
a torsional isolation spring (40, 410), a carrier (82, 408), and a wrap spring clutch (80, 406) configured to operate in a first mode in which rotary power is transmitted in a first rotational direction from the input member to the output member serially through the wrap spring clutch, the carrier, and the isolation spring, and a second mode in which the output member overruns the input member in the first rotational direction,
wherein the input member has a radial clutch drive surface (94, 411) that is engageable with a radially outer surface (421) of the wrap spring clutch for torque transfer therebetween,
wherein the carrier has a carrier clutch drive face (108, 436) that receives a first vector force (V1) from a face (96, 434) at a helical end (86, 432) of the wrap spring clutch, and an isolation spring drive face (118, 438) that receives a second vector force (V2) from a face (132, 440) at a helical end of the isolation spring, wherein the carrier clutch drive face (108, 436) and the isolation spring drive face (118, 438) are arranged to have a selected included angle (A) therebetween, so as to direct the second vector force to have a selected relationship with the first vector force so as to control a net force on the carrier that urges the carrier towards engagement with the radial clutch drive surface so as to generate essentially no tensile stresses on the carrier,
wherein the helical end of the wrap spring clutch extends along a helical path that substantially matches a helical path of a coil of the wrap spring clutch immediately adjacent the helical end, and, wherein the helical end is a terminal end of the wrap spring clutch.

14. The decoupler of claim 13, wherein the included angle is about 43 degrees.

15. A decoupler, comprising:
an input member (30, 402);
an output member (32, 404); and
a torsional isolation spring (40, 410), a carrier (82, 408), and a wrap spring clutch (80, 406) configured to operate in a first mode in which rotary power is transmitted in a first rotational direction from the input member to the output member serially through the wrap spring clutch, the carrier, and the isolation spring, and a second mode in which the output member overruns the input member in the first rotational direction,
wherein the input member has a radial clutch drive surface (94, 411) that is engageable with a radially outer surface (421) of the wrap spring clutch for torque transfer therebetween,
wherein the carrier has a carrier clutch drive face (108, 436) that receives a first vector force (V1) from a face (96, 434) at a helical end (86, 432) of the wrap spring clutch, and an isolation spring drive face (118, 438) that receives a second vector force (V2) from a face (132, 440) at a helical end of the isolation spring, wherein the wrap spring clutch has a mean wrap spring clutch diameter (107, 480) and the isolation spring has a mean isolation spring diameter (117, 482), and wherein the carrier clutch drive face and the isolation spring drive face are arranged based at least in part on the mean wrap spring clutch diameter and the mean isolation spring diameter so as to control a net force on the carrier that urges the carrier towards engagement with the radial clutch drive surface so as to generate essentially no tensile stresses on the carrier, wherein the helical end of the wrap spring clutch extends along a helical path that substantially matches a helical path of a coil of the wrap spring clutch immediately adjacent the helical end, and, wherein the helical end is a terminal end of the wrap spring clutch.

16. The decoupler of claim 2, wherein the included angle is about 43 degrees.

* * * * *